(12) United States Patent
Rawson, III

(10) Patent No.: US 6,480,966 B1
(45) Date of Patent: Nov. 12, 2002

(54) PERFORMANCE MONITOR SYNCHRONIZATION IN A MULTIPROCESSOR SYSTEM

(75) Inventor: Freeman-Leigh Rawson, III, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/455,715

(22) Filed: Dec. 7, 1999

(51) Int. Cl.[7] .............................. G06F 15/16; G06F 9/46
(52) U.S. Cl. ..................... 713/400; 710/260; 713/400; 709/400
(58) Field of Search ................... 709/400; 710/260; 713/400

(56) References Cited

U.S. PATENT DOCUMENTS

| | | | | |
|---|---|---|---|---|
| 5,802,378 A | * | 9/1998 | Arndt et al. | 395/740 |
| 5,949,971 A | * | 9/1999 | Levine et al. | 395/184.01 |
| 6,233,531 B1 | * | 5/2001 | Klassen et al. | 702/80 |
| 6,351,724 B1 | * | 2/2002 | Klassen et al. | 702/186 |

FOREIGN PATENT DOCUMENTS

JP 08263310 A * 10/1996 ............. G06F/9/46

* cited by examiner

Primary Examiner—Thomas Lee
Assistant Examiner—Nittin C Patel
(74) Attorney, Agent, or Firm—Joseph P. Lally; Casimer K. Salys

(57) ABSTRACT

A method, system, and computer readable medium for synchronizing performance monitors in the multiprocessor system are disclosed. The system includes a lead processor and at least one slave processor. The method includes informing the slave processor that a synchronization signal is forthcoming and waiting for an acknowledgment indicating that the slave processor is ready to receive the synchronization signal. In response to the slave processor's acknowledgment, the method includes sending the synchronization signal to the slave processor. The lead processor's performance monitors are set when the synchronization signal is sent and the slave processor's performance monitors are sent when the synchronization signal is received by the slave processor. In one embodiment, informing the slave processor that a synchronization signal is forthcoming is achieved by issuing a first inter-processor interrupt. In one embodiment, the sending of the synchronization signal is achieved by issuing a second interprocessor interrupt. In one configuration, waiting for the acknowledgment is accomplished by executing a spin loop with the lead processor. In one embodiment, the values set in the lead processor performance monitors are offset from the value set in the slave processor performance monitors, preferably by an offset that is indicative of the delay required for the synchronization signal to propagate from the lead processor to the slave processor.

24 Claims, 3 Drawing Sheets

PERFORMANCE MONITOR SYNCHRONIZATION IN A MULTIPROCESSOR SYSTEM

BACKGROUND

1. Field of the Present Invention

The present invention generally relates to the field of microprocessor based computers and more particularly to a method of synchronizing timestamp registers and performance counters in a multiprocessor system.

2. History of Related Art

A number of high performance superscalar microprocessors such as the PowerPC® 604 processor from IBM Corporation, the Pentium® family of processors from Intel Corporation, and the Sparc® family of processors from Sun Microsystems, Inc., facilitate system performance monitoring by incorporating user accessible timestamp and performance counters (collectively referred to herein as performance monitors). The timestamp register is typically implemented as a dedicated counter that is set to zero following a hardware reset and possibly at other times through user control. After reset, the timestamp register is incremented every processor clock cycle, even if the processor is halted, to provide a facility for calculating the number of clock cycles used to execute a task. Performance counters permit processor performance parameters to be monitored and measured. The information obtained from these counters can then be used for tuning system and compiler performance. Typically, the performance counters support counting of a variety of processor events such as, for example, the number of cache hits, the number of cache misses, the number of instructions issued, and the number of instructions completed. Those familiar with the operation of speculative, out-of-order, superscalar microprocessors will appreciate that the ability to monitor such processor performance characteristics is highly beneficial in evaluating the efficiency with which the processor is executing.

Increasingly, data processing systems are implemented with multiprocessor architectures in which two or more processors are interconnected to increase the performance capability of the system. In a multiprocessor system, an application program or thread may execute certain instructions on a first processor, other instructions on a second processor, and so forth. Monitoring the performance of multiprocessor systems through the use of the timestamp and the performance counter facilities is difficult unless the performance monitors of each processor in the system are synchronized (i.e., simultaneously reset or set to a known value). Synchronization ensures that the timestamp register and performance counters of each processor are measuring events that occur in the same period of time. Unfortunately, conventional multiprocessor systems designed with commercially distributed microprocessors typically lack dedicated hardware facilities for synchronizing the performance counters of the various processors that comprise the system. It is, therefore, highly desirable to implement a solution which synchronizes the performance monitors of each processor in a multiprocessor data processing without adding significant cost or complexity to the system.

SUMMARY OF THE INVENTION

The problems identified above are in large part addressed by a method, system, and computer readable medium for synchronizing performance monitors in a multiprocessor system as disclosed herein. The system includes a lead processor and at least one slave processor. The method includes informing the slave processor that a synchronization signal is forthcoming and waiting for an acknowledgment indicating that the slave processor is ready to receive the synchronization signal. In response to the slave processor's acknowledgment, the method includes sending the synchronization signal to the slave processor. The lead processor's performance monitors are set when the synchronization signal is sent and the slave processor's performance monitors are sent when the synchronization signal is received by the slave processor. In one embodiment, informing the slave processor that a synchronization signal is forthcoming is achieved by issuing a first inter-processor interrupt. In one embodiment, the sending of the synchronization signal is achieved by issuing a second inter-processor interrupt. In one configuration, waiting for the acknowledgment is accomplished by executing a spin loop with the lead processor. In one embodiment, the values set in the lead processor performance monitors are offset from the value set in the slave processor performance monitors, preferably by an offset that is indicative of the delay required for the synchronization signal to propagate from the lead processor to the slave processor.

BRIEF DESCRIPTION OF THE DRAWINGS

Other objects and advantages of the invention will become apparent upon reading the following detailed description and upon reference to the accompanying drawings in which.

Figure 1:
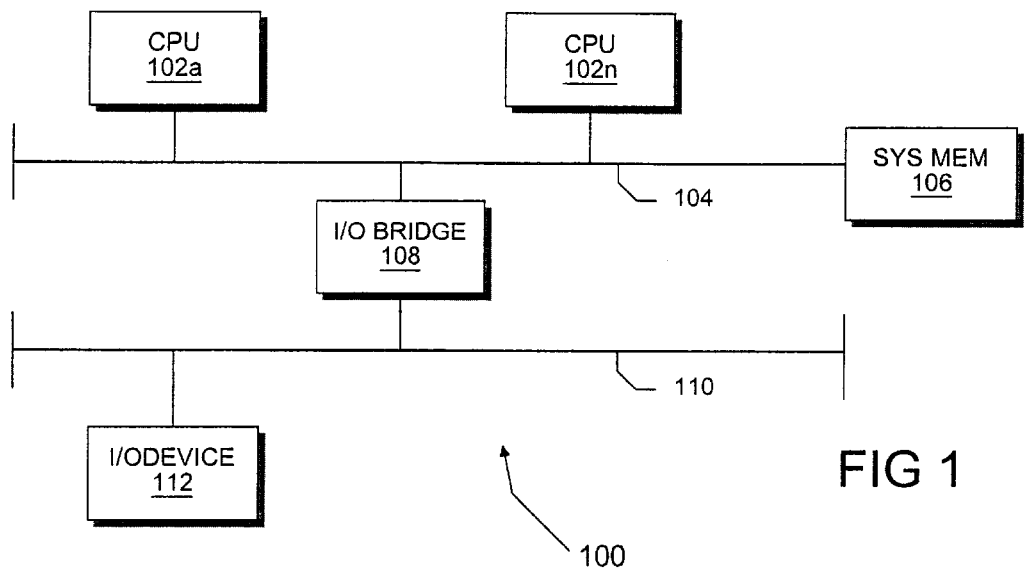
FIG. 1 is a simplified block diagram of a symmetric multiprocessor (SMP) data processing system suitable for use in one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Turning now to the drawings, FIG. 1 is a simplified block diagram of a data processing system 100 suitable for use with one embodiment of the present invention. System 100 includes multiple microprocessors 102a . . . 102n (collectively or generically referred to herein as processor(s) 102). The invention can be implemented in systems using a wide variety of processor architectures including, as examples, PowerPC® 604 processors from IBM Corporation, the SPARC family of processors from Sun Microsystems, Inc., and x86 compatible processors such as the Pentium® family of processors from Intel, Athlon® processors from Advanced Micro Devices, and others. Additional information concerning the PowerPC® processor is available in C. May et al. Ed., *PowerPC Architecture: a Specification for a New Family of RISC Processors*, (Morgan Kaufmann, 1994, 2d ed.), incorporated by reference herein. In the symmetric multiprocessor (SMP) architecture illustrated in FIG. 1, processors 102 access a single system memory 106 via a common system bus 104. In this arrangement, each processor 102 enjoys essentially equal access to system memory 106. Data processing system 100, as depicted in FIG. 1, further includes an I/O bridge 108 connected between system bus 104 and an I/O bus 110. As its name implies, I/O bus 110 provides a facility for connecting one or more I/O devices 112 which may include, as examples, an input device such as a keyboard or mouse, an output device such as a display terminal, and various other I/O devices such as hard disk controllers for providing access to a mass storage device, graphics adapters for enhancing performance of the display terminal, and high speed network adapters for connecting system 100 to other like systems via a local area network, wide area network, or other suitable network arrangement. In one embodiment, a portion of system memory 106 contains an operating system (or a portion thereof) such as an AIX® operating system from IBM Corporation or a Windows® operating system from Microsoft to coordinate the functions of the various components of system 100. Additional information concerning the AIX® operating system is available in *AIX Version 4.3 Technical Reference: Base Operating System and Extensions, Volumes 1 and 2.* (Order numbers SC23-4159 and SC-23-4160); *AIX Version 4.3 System Users Guide: Communications and Networks* (Order number SC23-4122); *AIX Version 4.3 System Users Guide: Operating Systems and Devises* (Order number SC23-4121) from IBM Corporation and incorporated by reference herein.

Figure 2:
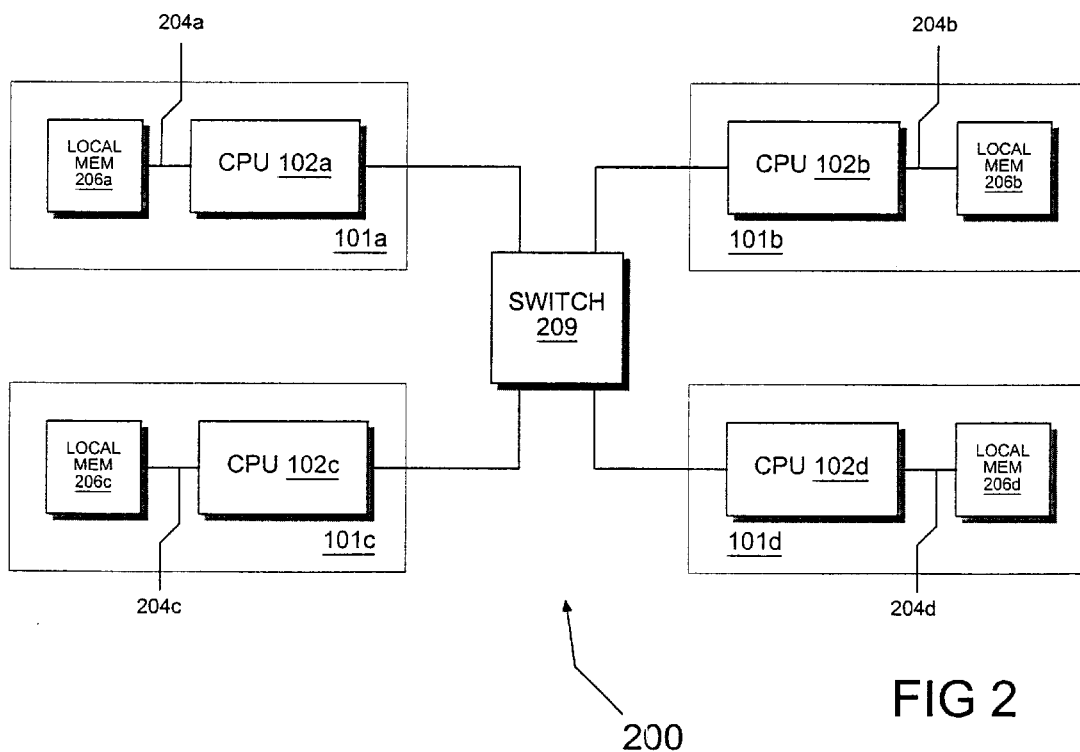
FIG. 2 is a simplified block diagram of a non-uniform memory architecture (NUMA) data processing system suitable for use in one embodiment of the present invention.

Turning now to FIG. 2, an embodiment of a second data processing system 200 suitable for use with the performance monitor synchronization method described herein is presented. In the depicted embodiment, data processing system 200 includes a set of nodes 101 (four of which, nodes 101*a*, 101*b*, 101*c*, and 101*d*, are shown). Each node 101 includes a corresponding processor 102*a* connected to a corresponding local memory 206 via a memory bus 204. In addition, the set of processors 102 are interconnected through a switch 209 such that each processor has indirect access to the local memories 206 of other processors 102 in system 200. In this non-uniform memory architecture (NUMA) system, each processor 102*a* has relatively fast and inexpensive access to its local memory 206 and a relatively slower and more expensive access to the local memories of the other processors in system 200. In one embodiment, the performance monitor synchronization techniques of the present invention may be extended to an embodiment of system 200 in which each node 101 may include multiple processors 102 coupled to a local memory 206 over memory bus 204.

In one embodiment, the invention contemplates a set of computer instructions suitable for execution by processors 102 and stored in a storage device such as system memory 106 (shown in FIG. 1) or local memory 206 for synchronizing performance monitors of the processors 102 in a multiprocessor data processing system. The computer instructions (or a subset thereof) may reside on an instruction cache memory of processor 102 or other dynamic memory such as system memory 106 or local memory 206 when the instructions are being executed by processors 102. At other times, the set of computer instructions may reside on a permanent or nonvolatile storage device such as, for example, a floppy diskette, a hard disk, a magnetic tape, a flash memory device, or a CD ROM.

Figure 3:
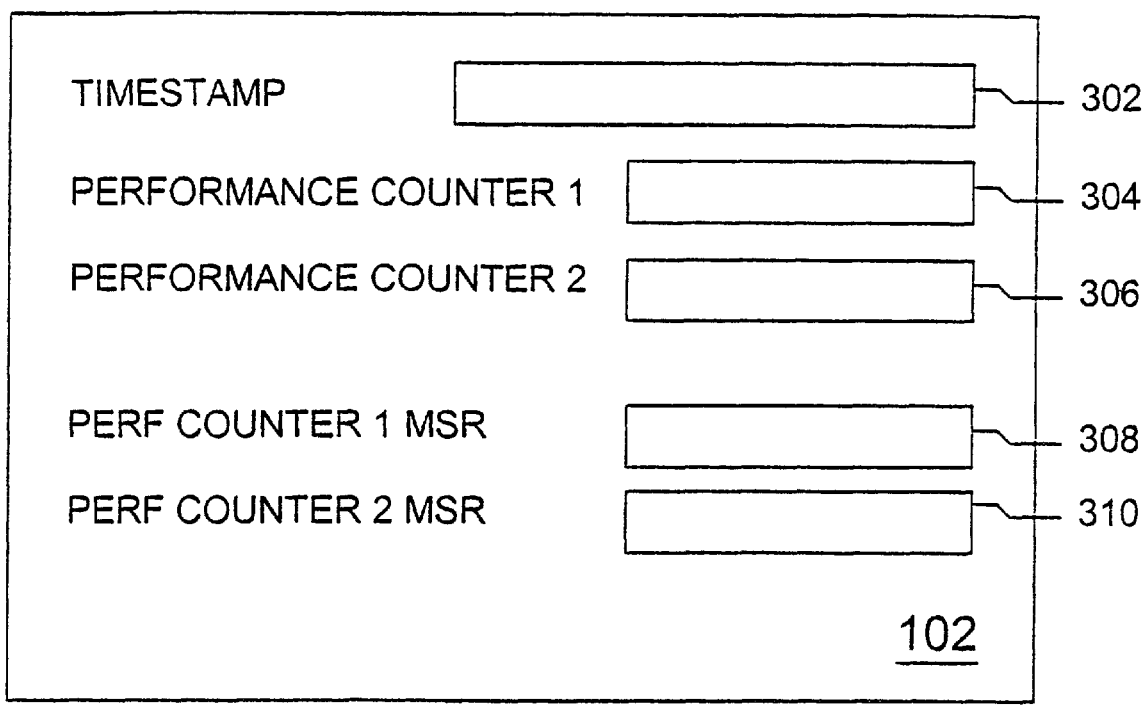
FIG. 3 is a simplified block diagram of a processor including timestamp and performance counter registers according to one embodiment of the present invention.

Referring now to FIG. 3, a block diagram illustrating additional detail of a processor 102 suitable for use with the present invention is depicted. In the depicted embodiment, processor 102 includes a dedicated timestamp register 302, and first and second performance counters 304 and 306, respectively. (Although a total of two performance counters are indicated in the depicted embodiment, other implementations may include more (or less) performance counters). Timestamp register 302 is adapted to increment with each processor clock cycle such that the timestamp contains a monotonically increasing value that uniquely identifies a corresponding clock cycle. In an alternative embodiment, the timestamp register 302 may increment once for some relatively small number of processor cycles, rather than every cycle. In one embodiment, timestamp register 302 is cleared following a hardware reset. In addition, timestamp register 302 may be reset or programmed (written to), depending upon the embodiment, as well as read, from a user application. In an embodiment in which it is desired to prevent unauthorized alteration of the timestamp, write access to timestamp register 302 may be restricted to operating system routines. Performance counters 304 and 306 are suitable for monitoring and counting the occurrence of specified processor events for the purpose of analyzing the performance characteristics of processor 102. Performance counters are particularly useful in superscalar processors supporting speculative and out-of-order execution where it is difficult to accurately predict the performance the processor will achieve while executing a particular application. Like timestamp register 302, performance counters 304 and 306 may be read from an application program and written to or reset from an application program or an operating system routine depending upon the type of write access that the system permits. FIG. 3 further indicates programmable performance counter model specific registers (MSRs) 308 and 310 that define the operation of performance counters 304 and 306 respectively. MSRs 308 and 310 preferably include a function definition field that indicates the type of events that are to be monitored. Typically, data processing system 100 as depicted in FIG. 1 and data processing 200 as depicted in FIG. 2 lack dedicated hardware facilities (such as a device pin) with which the performance counters and timestamps (collectively referred to as the performance monitors) of each processor 102 maybe simultaneously set or reset. The present invention addresses the absence of such a hardware facility with a software implemented method of achieving adequate synchronization among the various processors 102 in the data processing system.

Figure 4:
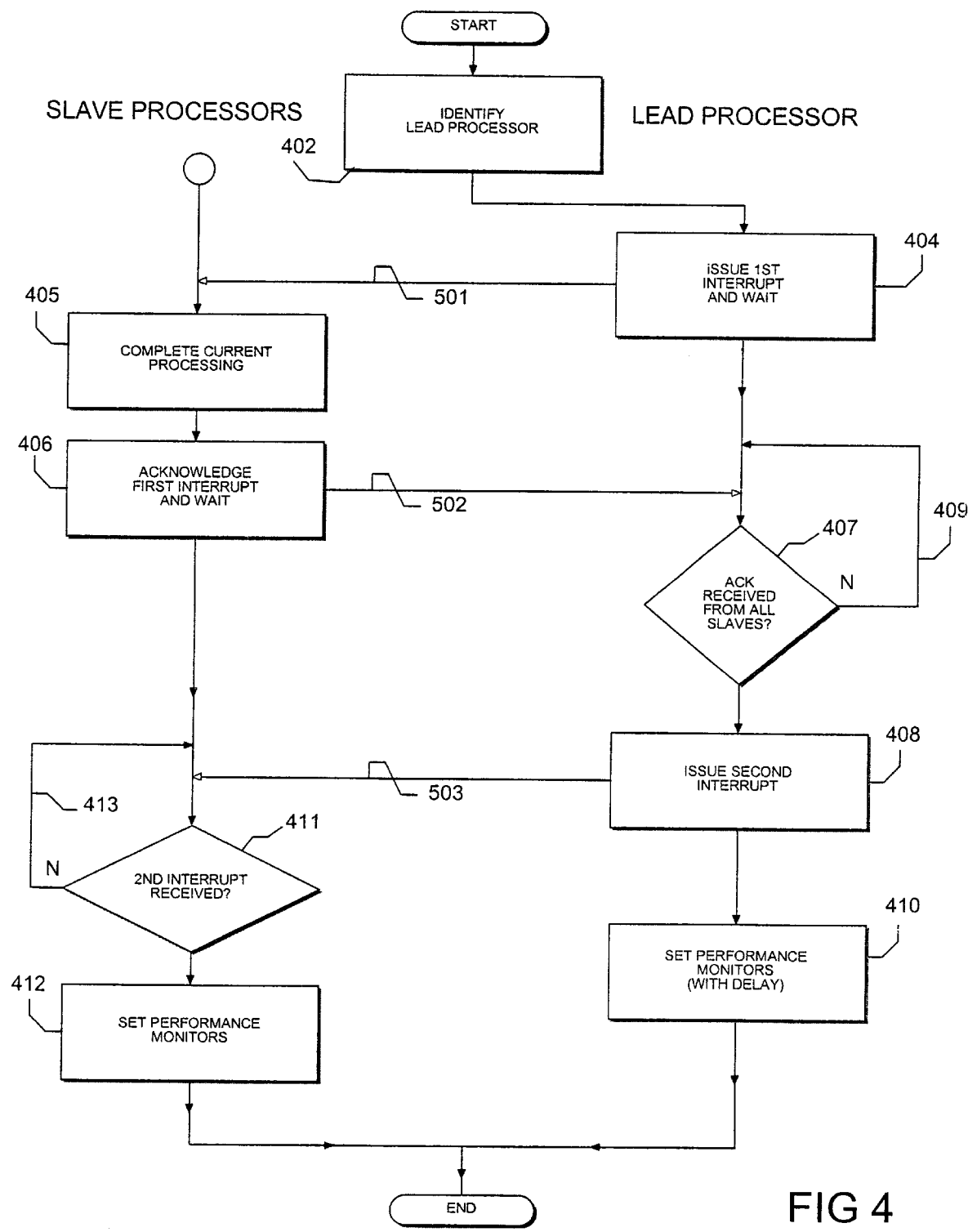
FIG. 4 is a flow diagram of illustrating a method of synchronizing performance monitors in a multiprocessor data processing system according to one embodiment of the present invention.

Turning now to FIG. 4, a flow diagram of a method 400 for synchronizing performance monitors in a multiprocessor data processing system (the system) according to the present invention is presented. In an initial step 402, a lead processor is selected from among the set of processors 102 (shown in FIGS. 1 and 2) in the data processing system. In one embodiment, the processor with the lowest processor ID is selected as the lead processor. In other embodiments, lead processor selection is based upon an algorithm such as an algorithm that selects the least busy processor as the lead processor or an algorithm that selects a different lead processor on a rotating basis after each hardware reset.

In step 404, a software agent executing on the lead processor issues a "pre-signal" that informs the other processors in the data processing system (the slave processors) that a synchronization signal is forthcoming. In one embodiment, the pre-signal is accomplished with a first inter-processor interrupt indicated by reference numeral 501 from the lead processor to the slave processors. (The flow diagram of FIG. 4 indicates lead processor activity on the right side of the diagram and slave processor activity on the left side). In one embodiment, first interprocessor interrupt 501 is accomplished using a broadcast facility such that only a single instruction is required to interrupt each slave processor in the system. After issuing the presignal, such as first interrupt 501, the software agent on the lead processor enters a wait state to prevent the lead processor from initiating other tasks once the performance monitor synchronization routine has been initiated to keep inter-processor response time to a minimum. In one embodiment the wait state is achieved by executing a spin loop routine indicated by the decision block 407 and the return path 409 in FIG. 4. As indicated in the drawing, the lead processor remains in the wait state until all slave processors have acknowledged first interrupt 501.

When first interrupt 501 is issued, the slave processors are in an unknown state and may well be engaged in tasks unrelated to the synchronization routine of the present invention. Thus, FIG. 4 indicates a step 405, in which the slave processors complete any tasks they may be executing after receiving first interrupt 501. Because a slave processor may be engaged in a long and complex task that will prevent it from responding to first interrupt 501, first interrupt 501 is issued with the knowledge that the slave processors may not be able to respond for a comparatively long time. In step 406, software agents on each slave processor issue an interrupt acknowledge 502 back to the lead processor in response to detecting first interrupt 501. After acknowledging first interrupt 501, the slave processors enter a wait state such as the spin loop cycle indicated by decision block 411 and return path 413 that prevents the slave processors from initiating other tasks while the synchronization process is executing. By transitioning each slave processor to a wait state in response to first interrupt 501, method 400 ensures that each slave processor will be able to acknowledge and respond to a subsequent interrupt rapidly. While the slave processors are engaged in suspending activity, acknowledging the first interrupt and transitioning to a wait state, the lead processor continues to execute its loop. When the lead processor has received acknowledgments from each of the slave processors, the system is then in a state to perform the performance monitor synchronization because each processor in the system is in a wait state and can respond to a subsequent synchronization signal with a minimum of delay. Minimizing the delay between the time the lead processor resets its performance monitors and the time the slave processors reset their performance monitors is of primary importance in achieving meaningful multiprocessor synchronization.

After receiving first interrupt acknowledge signals from each of slave processor, the lead processor issues a synchronization signal in step 408 that directs the slave processors to reset or program their performance monitors and resets or programs its performance monitors in step 410. In the depicted embodiment, the synchronization signal comprises a second inter-processor interrupt 503 from the lead processor to each of the slave processors. In response to receiving second interrupt 503 from the lead processor, each slave processor exits its wait state and resets or programs its corresponding performance monitors in step 412. By ensuring that each slave processor is idling in a wait state when the synchronization signal is issued, the present invention minimizes the delay between the performance monitor resetting of the lead processor in step 410 and the performance monitor setting of the slave processor in step 412 thereby achieving a synchronized resetting or presetting of performance monitors in a multiprocessor system without requiring dedicated synchronization hardware.

In one embodiment, the performance monitor synchronization method disclosed herein programs the performance monitor of each processor with the same value. Although this embodiment enjoys the benefit of simplicity, it will be appreciated that, because inter-processor interrupts require a finite, if small, length of time to execute, the resetting of the performance monitors in the slave processors and the resetting of the performance monitors in the lead processor do not occur at precisely the same moment even if all slave processors are essentially sitting and waiting for the synchronization signal. To improve the accuracy of the synchronization process, another embodiment of the invention contemplates modifying the values programmed into the performance monitors of the slave processors to reflect the interrupt delay characteristic of the system. If, for example, analysis of a particular data processing system reveals that the inter-processor delay is approximately 10 cycles, then method 400 can account for this inter-processor delay and produce a more accurate synchronization by resetting the appropriate counters of the slave processors to a value that is 10 cycles greater than the value programmed into the lead processor. Thus, if the timestamp register 302 of the lead processor is preset or programmed to zero in step 410 following acknowledgment of the first interrupt from all of the slave processors, then the timestamp registers 302 of each slave processor will be programmed to a value of 10 in step 412 upon receiving the synchronization signal from the lead processor. By approximating and accounting for the inter-processor delay, this embodiment of the invention contemplates a more accurate synchronization of the various performance monitors. In embodiments in which timestamp registers 302 can only be reset to a value of 0, the inter-processor delay may be accounted for by delaying the resetting of the lead processor in step 410 by the appropriate number of cycles following issuance of the second inter-processor interrupt in step 408.

In one embodiment, synchronization method 400 according to the present invention, including the programming or resetting of the performance may be written directly into an application program. In other embodiments where it is desirable to control access to the performance monitors, or where the microprocessor architecture imposes restrictions on access to the performance monitors, synchronization method 400 itself may be implemented as an operating system task that is invoked through an application program interface. In this embodiment, an application programmer may invoke the synchronization routine without requiring direct access to the performance monitor registers themselves.

It will be apparent to those skilled in the art having the benefit of this disclosure that the present invention contemplates a method of synchronizing performance counters among various processors in a multiprocessor system. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of synchronizing performance monitors in the multiprocessor system including a lead processor and at least one slave processor, comprising:

informing the slave processor that a synchronization signal is forthcoming;

waiting for an acknowledgment indicating the slave processor is ready to receive the synchronization signal;

responsive to the slave processor's acknowledgment, sending the synchronization signal to the slave processor; and setting the lead processor's performance monitors when the synchronization signal is sent and setting the slave processor's performance monitors when the synchronization signal is received by the slave processor.

2. The method of claim 1, wherein informing the slave processor that a synchronization signal is forthcoming comprises issuing a first inter-processor interrupt.

3. The method of claim 1, wherein sending the synchronization signal comprises issuing a second inter-processor interrupt.

4. The method of claim 1, wherein waiting for the acknowledgment comprises executing a spin loop with the lead processor.

5. The method of claim 1, wherein the slave processor waits for the synchronization signal after the acknowledgment is issued.

6. The method of claim 5, wherein the slave processor waiting comprises the slave processor executing a spin loop.

7. The method of claim 1, wherein the values set in the lead processor performance monitors are offset from the value set in the slave processor performance monitors, and wherein the offset is indicative of the delay required for the synchronization signal to propagate from the lead processor to the slave processor.

8. The method of claim 1, wherein the setting of the lead processor's performance monitors when the synchronization signal is sent includes delaying the setting of the lead processor's performance monitors from the sending of the synchronization signal, wherein the delay is indicative of the delay required for the synchronization signal to propagate from the lead processor to the salve processor.

9. A data processing system, comprising;

a set of processors, including a lead processor and a slave processor;

storage means accessible to the set of processors;

input means and display means connected to the set of processors;

wherein the storage means is configured with a set of computer instructions executable by the set of processors, the instructions comprising:

means for informing the slave processor that a synchronization signal is forthcoming;

means for waiting for an acknowledgment indicating the slave processor is ready to receive the synchronization signal;

responsive to the slave processor's acknowledgment, means for sending the synchronization signal to the slave processor; and means for setting the lead processor's performance monitors when the synchronization signal is sent and setting the slave processor's performance monitors when the synchronization signal is received by the slave processor.

10. The system of claim 9, wherein the means for informing the slave processor that a synchronization signal is forthcoming comprises means for issuing a first inter-processor interrupt.

11. The system of claim 9, wherein the means for sending the synchronization signal comprises means for issuing a second inter-processor interrupt.

12. The system of claim 9, wherein the means for waiting for the acknowledgment comprises executing a spin loop with the lead processor.

13. The system of claim 9, wherein the slave processor waits for the synchronization signal after the acknowledgment is issued.

14. The system of claim 13, wherein the slave processor waiting comprises means for the slave processor to execute a spin loop.

15. The system of claim 9, wherein the values set in the lead processor performance monitors are offset from the value set in the slave processor performance monitors.

16. The system of claim 15, wherein the offset is indicative of the delay required for the synchronization signal to propagate from the lead processor to the slave processor.

17. A computer program product, comprising a computer readable medium configured with a set of computer executable instructions, the instructions comprising:

means for informing the slave processor that a synchronization signal is forthcoming;

means for waiting for an acknowledgment indicating the slave processor is ready to receive the synchronization signal;

responsive to the slave processor's acknowledgment, means for sending the synchronization signal to the slave processor; and means for setting the lead processor's performance monitors when the synchronization signal is sent and setting the slave processor's performance monitors when the synchronization signal is received by the slave processor.

18. The computer program product of claim 17, wherein the means for informing the slave processor that a synchronization signal is forthcoming comprises means for issuing a first interprocessor interrupt.

19. The computer program product of claim 17, wherein the means for sending the synchronization signal comprises means for issuing a second inter-processor interrupt.

20. The computer program product of claim 17, wherein the means for waiting for the acknowledgment comprises executing a spin loop with the lead processor.

21. The computer program product of claim 17, wherein the slave processor waits for the synchronization signal after the acknowledgment is issued.

22. The computer program product of claim 21, wherein the slave processor waiting comprises means for the slave processor to execute a spin loop.

23. The computer program product of claim 17, wherein the values set in the lead processor performance monitors are offset from the value set in the slave processor performance monitors.

24. The computer program product of claim 23, wherein the offset is indicative of the delay required for the synchronization signal to propagate from the lead processor to the slave processor.

* * * * *